March 21, 1950 — O. R. SMITH — 2,501,242
PIPE PULLING MACHINE
Filed Sept. 29, 1944 — 2 Sheets-Sheet 1

Inventor
Oliver R. Smith
By E. V. Hardway, Attorney

March 21, 1950  O. R. SMITH  2,501,242
PIPE PULLING MACHINE

Filed Sept. 29, 1944  2 Sheets-Sheet 2

Inventor
Oliver R. Smith

By
E. V. Hardway
Attorney

Patented Mar. 21, 1950

2,501,242

UNITED STATES PATENT OFFICE 2,501,242

PIPE PULLING MACHINE

Oliver Ross Smith, Fort Worth, Tex.

Application September 29, 1944, Serial No. 556,448

5 Claims. (Cl. 254—29)

This invention relates to a pipe pulling machine.

An object of the invention is to provide a machine of the character described specially designed for welding together the abutting ends of pipe by heating said ends to a welding temperature and at the same time forcing the pipe ends together in order to effect a continuous weld entirely around the pipe.

Another object of the invention is to provide electrodes formed of copper or other suitable conducting material which are clamped tightly about the respective abutting ends with means for connecting said electrodes into an electrical circuit whereby a current of high amperage will be caused to pass through the ends of the pipe between the electrodes to heat the same to the fusion point while the pipe ends are being forced together.

Another object of the invention is to provide a machine of the character described which is of very simple construction, light in weight, may be cheaply and easily produced and readily handled in applying it to the joints of pipe to be welded into a pipe line.

With the above and other objects in view, the invention has particular relation to certain novel features of construction, operation and arrangement of parts, an example of which is given in this specification and illustrated in the accompanying drawings, wherein.

Figure 1:
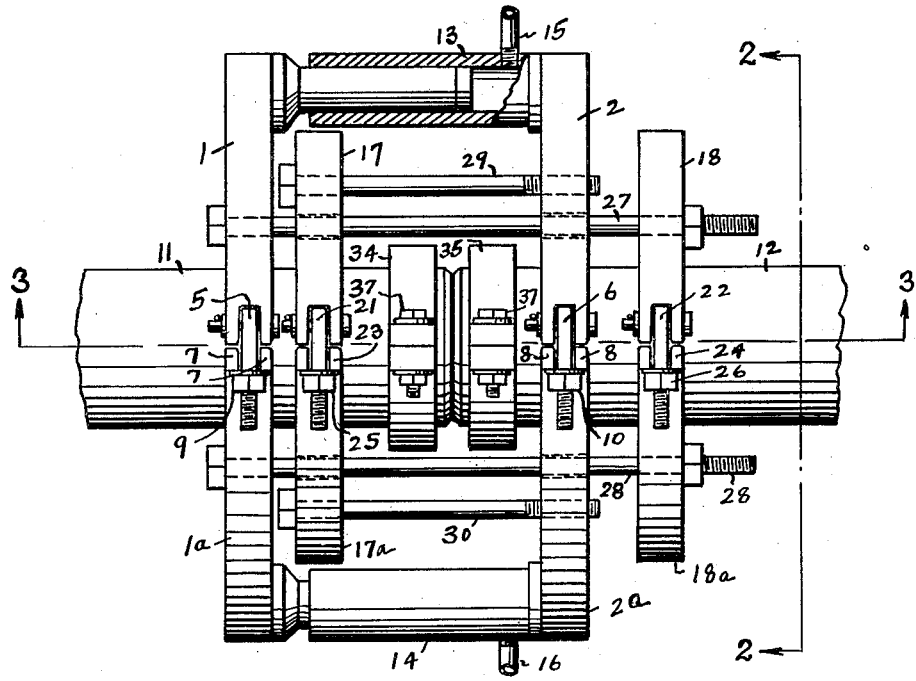
Figure 1 shows a side elevation of the complete machine.
Figure 2:
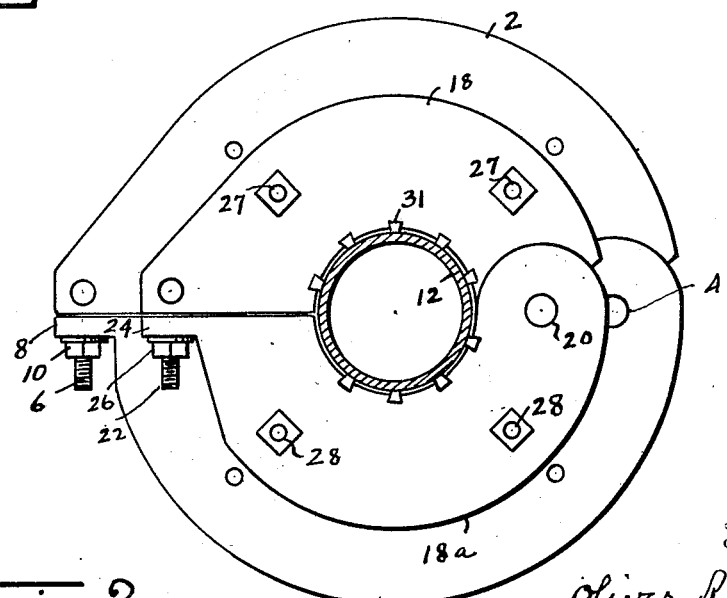
Figure 2 shows an end view thereof, taken on the line 2—2 of Figure 1.

Referring now more particularly to the drawings wherein like numerals of reference designate similar parts in each of the figures, the numerals 1, 1a and 2, 2a designate the complemental sections, respectively, of the frame members. The sections 1, 1a are pivoted together, at one end, on the pivot pin 3 and the complemental sections 2, 2a are pivoted together, at one end, on the pivot pin 4. These respective complemental sections are of a general arcuate shape and at their other ends they may be latched together around the pipe by the latch bolts 5, 6, which as shown are pivoted to the sections 1, 2 and may be fitted between the spaced lugs 7, 7 and 8, 8 on the corresponding ends of sections 1a, 2a and secured in latched position by the nuts 9, 10, threaded onto the ends of said latch bolts.

Figure 3:
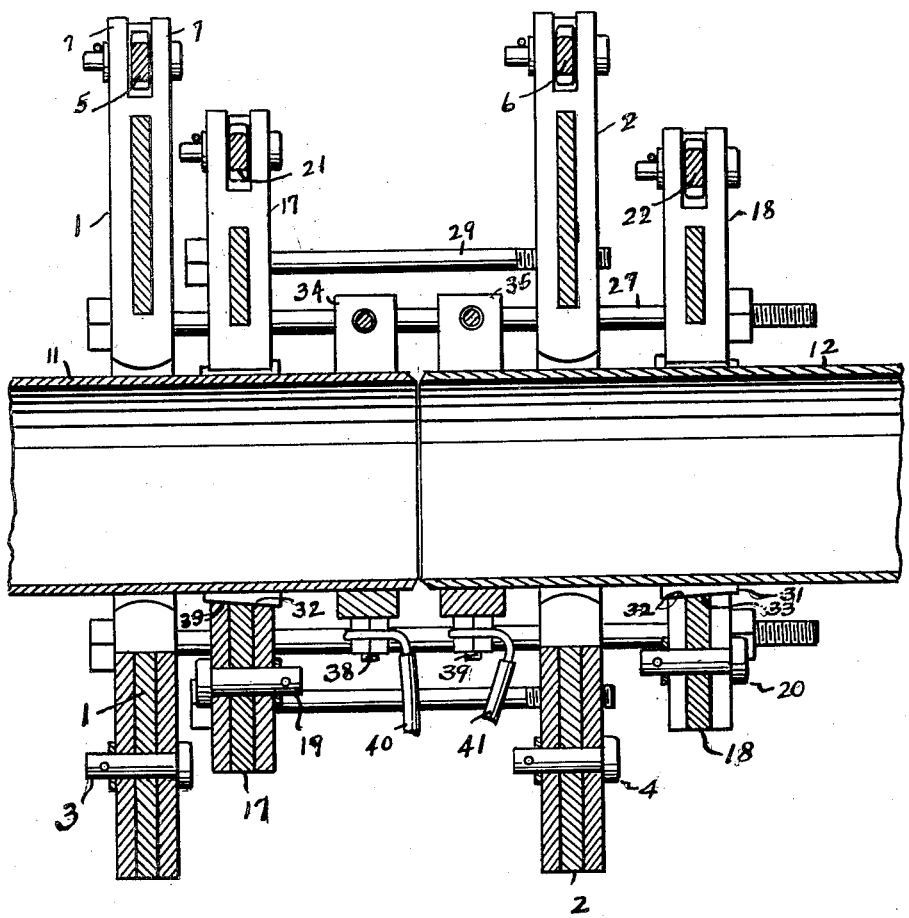
Figure 3 shows a sectional view taken on the line 3—3 of Figure 1.

These frame members surround the adjacent ends of the respective pipe sections to be welded together. In the present illustration these sections are designated by the numerals 11 and 12 and preferably their ends will be beveled as shown in Figure 3. The inside diameter of these frame members is somewhat greater than the outside diameter of the pipe sections which they surround so that said pipe sections may readily move therethrough.

Mounted between the frame members are the jacks 13, 14. These are preferably hydraulic jacks comprising the cylinders attached to one of the frame members with pistons therein having piston rods whose outer ends may be connected to the other frame member. Fluid may be introduced into the cylinders from any suitable source of pressure through the respective lines 15, 16 to force the frame members apart and may be relieved therefrom to allow said frame members to move toward each other.

There are the pipe clamps comprising the complemental sections 17, 17a and 18, 18a. These sections are arcuate in shape and are pivoted together, at one end, on pivots 19, 20 and may be latched together, at their other ends, by the latch bolts 21, 22 which are pivoted to the sections 17, 18, respectively, and are adapted to fit between the spaced lugs 23, 23 and 24, 24 carried by the corresponding sections 17a and 18a. They may be latched in closed position by means of the nuts 25, 26, threaded onto the latch bolts 21, 22. The clamps 17, 17a and 18, 18a are arranged on opposite sides of the frame member 2, 2a. The sections 1 and 18 are connected by the bolts 27, 27 and the sections 1a, 18a are connected by the bolts 28, 28. These bolts pass loosely through enlarged openings in the sections 17, 2 and 17a, 2a, respectively, so that they will not bind when the machine is unlatched and swung open.

The sections of the frame members 2, 2a are connected to the corresponding sections of the clamp members 17, 17a by the bolts 29, 29 and 30, 30 which have enlarged heads to engage the sections 17, 17a and are threaded, at their other ends, into the opposing sections 2, 2a.

From the foregoing it is apparent that as the frame members are forced apart by the hydraulic jacks the clamp members will be drawn together. These clamp members engage the corresponding pipes 11 and 12 and force their ends together under constant pressure while the heat is being applied.

Dovetailed into the respective sections 17, 17a and 18, 18a of the clamps are the pipe gripping jaws 31 whose inner surfaces may be knurled or roughened so as to engage the corresponding pipe; also their outer faces 32 are tapered and contact with the co-acting tapering faces 33 of the clamps 17, 17a and 18, 18a so that as the clamps are drawn together the jaws 32 will be forced inwardly into secure engagement with the corresponding pipe. When the pressure is relieved in the jack cylinders 13, 14 the pull on the clamps will be relieved so that they may be readily released from the pipe.

In order to heat the adjacent ends of the pipe the electrodes 34, 35 are provided. These are formed of bands of copper or other good conducting material and are fitted around the ends of the pipe and clamped tightly thereon by the clamp bolts 36, 37. These electrodes are separate parts and are not attached to the rest of the machine in any manner. They are provided with the terminal posts 38, 39 to which the electrical conductors 40, 41 are connected. One conductor leads from a suitable portable generator which may be mounted on a truck or other transporting vehicle which moves along the pipe line right of way and which also carries the pump for supplying hydraulic pressure to the jacks. The other conductor is suitably grounded.

High amperage current passing through the beveled ends of the pipe between the electrodes causes the pipe ends between the electrodes to immediately heat to the fusion point. When the metal of the pipe reaches the fusion point the pipe ends are forced together with the pressure machine causing the molten metal to fill the groove formed by the beveled ends of the pipe and the metal then having become fused together the high amperage electric current is cut-off and the pipe allowed to cool thereby completing the welding process and forming the pipe sections into one continuous pipe.

The machine may then be released from the pipe and together with the electrodes moved in any selected manner to the next joint where the welding process is repeated.

It is, of course, obvious that other conventional means may be employed for heating the adjacent pipe ends to a welding temperature.

What I claim is:

1. A pipe pulling machine comprising, a frame shaped to surround the abutting ends of pipe to be welded together and composed of two end members which are relatively movable, means connected to said end members for applying pressure to said end members to force them apart, a pair of pipe engaging clamps shaped to surround and engage the pipe and arranged alternately, with respect to the end members, rods for connecting one of said end members to the remote clamp, rods connecting the other end member to the other clamp, said rods being thus arranged so that as the end members are moved apart the clamp members will be moved toward each other and will force the abutting ends of the pipe together the rods connecting one end member with its clamp extending through the other end member and clamp.

2. A pipe pulling machine comprising, a frame shaped to surround the abutting ends of pipe to be welded together and composed of two end members which are relatively movable, means for applying pressure to said end members to force them apart, a pair of pipe engaging clamps shaped to surround and engage the pipe, pull rods connecting one of said end members to one of the clamps, pull rods connecting the other end member to the other clamp, said end members and clamps being alternately arranged, said connecting pull rods connected to one end member being connected to the remote clamp and the connecting pull rods connected to the other end member being connected to the other clamp so that as the end members are moved apart the clamp members will be moved toward each other and will force the abutting ends of the pipe together.

3. A pipe pulling machine comprising, a frame formed of complemental sections and shaped to be secured and latched around the abutting ends of pipe to be welded together and composed of relatively movable end members, jacks connected to the respective end members for moving said end members apart, a pair of pipe engaging clamps alternately arranged with respect to the end members and formed of complemental sections and shaped to be latched around, and in engagement with the pipe ends, rods connecting one end member with the clamp remote from it and extending through the other end member and clamp, rods connecting said other end member with the other clamp, said rods and end members forming means for moving the clamps toward each other as the end members are forced apart whereby the abutting ends will be held together under pressure.

4. A pipe pulling machine comprising, a frame composed of two frame members, each frame member being formed of complemental sections and shaped to surround the respective abutting ends of pipe to be pulled together, said sections being pivoted together at one end, means for latching the other ends of the sections around the pipe, pipe clamps comprising complemental sections hinged together at one end and means for latching the other ends of the clamps about the respective pipe ends, jacks connected to the respective frame members for moving said frame members apart, said clamp members being alternately arranged with respect to the frame members, pipe engaging means carried by the clamp members, rods connecting one frame member with the clamp member remote from it and extending through the other frame member and clamp member, rods connecting said other frame member with the other clamp member, said rods and frame members forming means for moving the clamp members and clamps toward each other as the frame members are forced apart whereby the abutting pipe ends will be held together under pressure.

5. A pipe pulling machine comprising, a frame shaped to surround the abutting ends of pipe to be welded together and composed of two members which are relatively movable toward and from each other, means for applying pressure to said end members to force them apart, a pair of pipe engaging clamps shaped to surround and engage the pipe, said end members and clamps being spaced apart longitudinally of the pipe and the clamps and end members being alternately arranged along the pipe, pull rods connecting one of said end members to one of the clamps, pull rods connecting the other end member to the other clamp, said connecting rods connected to one end member being connected to the remote clamp and the connecting rods connected to the other end member being connected to the other clamp so that as the end members are moved apart the clamp members will be moved toward each other and will force the abutting ends of the pipe together.

OLIVER ROSS SMITH.

REFERENCES CITED

The following references are of record in the file of this patent:

UNITED STATES PATENTS

| Number | Name | Date |
|---|---|---|
| 423,735 | Coffin | Mar. 18, 1890 |
| 1,072,614 | Hodges | Sept. 9, 1913 |
| 2,229,248 | Lamb | Jan. 21, 1941 |
| 2,276,354 | Trainer | Mar. 17, 1942 |
| 2,350,716 | Bissout et al. | June 6, 1944 |
| 2,376,765 | Forbes | May 22, 1945 |